(12) United States Patent
Robalewski

(10) Patent No.: US 8,255,868 B1
(45) Date of Patent: Aug. 28, 2012

(54) METHOD AND SYSTEM FOR PROVIDING SETUP ASSISTANCE FOR COMPUTING SYSTEM IMPLEMENTED APPLICATIONS

(75) Inventor: Randall Robalewski, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 1386 days.

(21) Appl. No.: 11/853,722

(22) Filed: Sep. 11, 2007

(51) Int. Cl.
*G06F 9/44* (2006.01)
(52) U.S. Cl. ........................................................ 717/100
(58) Field of Classification Search .................... 717/100
See application file for complete search history.

(56) References Cited

U.S. PATENT DOCUMENTS

| | | | | |
|---|---|---|---|---|
| 2003/0058267 | A1* | 3/2003 | Warren | 345/705 |
| 2003/0101165 | A1* | 5/2003 | Warren | 707/1 |
| 2004/0268225 | A1* | 12/2004 | Walsh et al. | 715/501.1 |
| 2006/0069635 | A1* | 3/2006 | Ram et al. | 705/37 |
| 2006/0070077 | A1* | 3/2006 | Erlandson et al. | 718/104 |
| 2006/0225034 | A1* | 10/2006 | Peck et al. | 717/106 |
| 2007/0192159 | A1* | 8/2007 | Root et al. | 705/9 |
| 2007/0244976 | A1* | 10/2007 | Carroll et al. | 709/206 |
| 2007/0250711 | A1* | 10/2007 | Storey | 713/168 |
| 2008/0189622 | A1* | 8/2008 | Sanchez et al. | 715/752 |
| 2009/0183140 | A9* | 7/2009 | Peck et al. | 717/113 |
| 2010/0229110 | A1* | 9/2010 | Rockey et al. | 715/760 |
| 2011/0087581 | A1* | 4/2011 | Ram et al. | 705/37 |

* cited by examiner

*Primary Examiner* — Anna Deng
(74) *Attorney, Agent, or Firm* — McKay and Hodgson, LLP; Philip McKay; Sean P. Lewis

(57) ABSTRACT

A method and system for providing setup assistance for applications includes a process for providing setup and/or operational assistance for applications whereby as a user implements a given computing system implemented application, the user of the computing system implemented application is offered assistance for setting up and/or operating all, or part of, the computing system implemented application based, at least in part, on the amount of data, and/or the type of data, the user is entering and/or has entered, for use with and/or by the given computing system implemented application.

21 Claims, 9 Drawing Sheets

300

---

MODULE 6: CUSTOMER LISTING MODULE   301

Module Description:   303
In this module a listing of customers and their associated balances is created and/or imported

Potential Issues:   305
In this module, customer data can either be entered manually or imported from another application.
When data is to be imported,
it is often advisable
to obtain setup assistance for creating
a mapping of fields and other technical issues.
In addition, proper listings of customer balances
Is critical and therefore also often requires setup assistance.

Specific Issues:   307
Based on the information you provided it appears you may wish to import multiple customer listings. Consequently, you may wish to seek setup assistance for this module.

309  ☐  SKIP THIS MODULE FOR NOW AND FLAG IT

311  ☐  LINK ME TO A SETUP ASSISTANT

313  ☒  PROCEED WITHOUT ASSISTANCE

MODULE 6: CUSTOMER LISTING MODULE  301

| CUSTOMER NAME | ADDRESS | PHONE | DATE OF LAST PURCHASE | BALANCE |
|---|---|---|---|---|
| CUSTOMER A | 11 1ST STREET | (831) 111-1111 | 1/1/07 | |
| CUSTOMER B | 22 2ND STREET | (831) 222-1111 | 2/1/07 | |
| CUSTOMER C | 33 3RD STREET | (831) 333-1111 | 3/1/07 | |
| CUSTOMER D | 44 4TH STREET | (831) 444-1111 | 4/1/07 | |
| CUSTOMER E | 55 5TH STREET | (831) 555-1111 | 5/1/07 | |

403 405 407 409 411

413 Proper listings of customer balances is critical and therefore often requires setup assistance.
Your data indicates you have several balances to transfer. Therefore, you may wish to seek assistance with this operation

415 [X] SKIP THIS OPERATION FOR NOW AND FLAG IT

417 [ ] LINK ME TO A SETUP ASSISTANT

419 [ ] PROCEED WITHOUT ASSISTANCE

MODULE 6: CUSTOMER LISTING MODULE 301

Module implementation evaluation: 503
50% successful
In this module you skipped the customer balance entry section.

Potential Issues: 505
Proper listings of customer balances
is critical and therefore often requires setup assistance.

Specific Issues: 507
Based on the information you provided it appears you may
wish to import multiple customer balances. Consequently, you may
wish to seek setup assistance for this module.

509 ☐ SKIP THIS MODULE FOR NOW AND FLAG IT

511 ☒ LINK ME TO A SETUP ASSISTANT

513 ☐ PROCEED WITHOUT ASSISTANCE

```
┌─────────────────────────────────────────────────────────────────┐
│                                                            601  │
│          MODULE 7: CHART OF ACCOUNTS                            │
│                                                                 │
│              Module implementation evaluation : 603             │
│     You have completed entry of your Chart of Accounts. However,│
│            your Chart of Accounts is out of balance .           │
│                                                                 │
│                      Potential Issue:    605                    │
│      An accurate set of accounting records requires a Chart of  │
│                  Accounts that is in balance.                   │
│                                                                 │
│                      Correcting Issue:  607                     │
│   If you are familiar with the concept of a Chart of Accounts, you │
│    should compare your entries to your previous accounting records │
│                     to identify discrepancies.                  │
│   If you would like assistance correcting this error, select one of│
│                   the assistance options below.                 │
│                                                                 │
│                                                                 │
│      609    [ ]   SPEAK TO A SUPPORT REPRESENTATIVE ($100)      │
│                                                                 │
│      611    [X]   FIND A LOCAL PROFESSIONAL TO PROVIDE          │
│                   ON-SITE DATA REVIEW ($300)                    │
│                                                                 │
│      613    [ ]   PROCEED WITHOUT ASSISTANCE                    │
│                                                                 │
└─────────────────────────────────────────────────────────────────┘
```

MODULE 7: CHART OF ACCOUNTS     701

Module implementation evaluation: 703
You have completed import of your Chart of Accounts. However, your Chart of Accounts is out of balance.

Potential Issue: 705
An accurate set of accounting records requires a Chart of Accounts that is in balance.

Correcting Issue: 707
If you are familiar with the concept of a Chart of Accounts, you should review your data to identify discrepancies.
If you would like assistance correcting this error, select one o f the assistance options below.

709 [ ] SPEAK TO A SUPPORT REPRESENTATIVE ($100)

710 [X] USE OUR DATA CONVERSION SERVICE ($200)

711 [ ] FIND A LOCAL PROFESSIONAL TO PROVIDE ON-SITE DATA REVIEW ($300)

713 [ ] PROCEED WITHOUT ASSISTANCE

SELECT YOUR SUPPORT PLAN  801

We offer several support plans to meet your needs.  803
Based on an analysis of your data file, we recommend
the SILVER PLAN. The low complexity of your data file
does not require the additional features offered by our
higher-level plans.

809 [X]  SILVER PLAN ($100)

811 [ ]  GOLD PLAN ($200)

813 [ ]  PLATINUM PLAN ($300)

```
              SOFTWARE SUPPORT PLAN                901

We offer several support plans to meet your needs.    903
      Based on an analysis of your data file, we recommend
      the PLATINUM PLAN. This recommendation is based on the
                          following:
                                                            905
  - You have identified your business type as 1120 Corporation
         (the SILVER PLAN does not cover corporate issues)

- You have set up employees with payroll information
           (the GOLD PLAN does not cover payroll issues)

909   [ ]    SILVER PLAN ($100)

911   [ ]    GOLD PLAN ($200)

913   [X]    PLATINUM PLAN ($300)
```

FIG.9

METHOD AND SYSTEM FOR PROVIDING SETUP ASSISTANCE FOR COMPUTING SYSTEM IMPLEMENTED APPLICATIONS

BACKGROUND

Numerous computing system implemented applications are currently available for both personal and business related use. These computing system implemented applications include, but are not limited to: computing system implemented personal and small business financial management systems, packages, programs, modules, or applications; computing system implemented business systems, packages, programs, modules, or applications; computing system implemented point-of-sale management systems, packages, programs, modules, or applications; computing system implemented tax preparation systems, packages, programs, modules, or applications; computing system implemented accounting and/or invoicing systems, packages, programs, modules, or applications; and various other electronic data management systems, packages, programs, modules, or applications, whether known at the time of filling or as developed later.

While these computing system implemented applications often provide efficient and accurate methods for gathering and processing data, proper setup and/or operation of these computing system implemented applications i.e., integrating and adapting the computing system implemented application to the user's specific data and processing needs, is often a critical step for ensuring the computing system implemented applications operate in the intended fashion. Not surprisingly, experience has shown that in order to ensure user satisfaction with a given computing system implemented application, it is important that the process of setting up and/or operating the computing system implemented application be as efficient, accurate, and easy an exercise as possible. Consequently, it is often advisable that a user obtain professional assistance when setting up and/or operating a given computing system implemented application and experience has also shown that users obtaining professional assistance are far more likely to be satisfied with the given computing system implemented application and are far more likely to continue to use the computing system implemented application.

Currently, some providers of computing system implemented applications offer professional assistance programs whereby a limited amount of professional assistance is offered, either as part of the purchase price of the computing system implemented application or as an additional service. However, the level of assistance required by a given user varies considerably from user-to-user, making it virtually impossible to determine how much assistance a given user will need, or to even define an "average" user. As one example, for a computing system implemented business accounting system, it would often be advisable for a new user of the computing system implemented business accounting system to consult with an accountant having a working knowledge of the computing system implemented business accounting system when first implementing the computing system implemented business accounting system. However, the needs of a user who is just starting up a home based Internet business will be far different than the needs of an established retailer with significant legacy data or a medium to large business having an accounting department and established accounting procedures.

This inability to accurately pre-determine the level of assistance, and what type of assistance, that will be needed by a given user makes it difficult, if not impossible, for the providers of computing system implemented applications to economically provide "pre-packaged" computing system implemented application assistance. In addition, it is also often difficult for the providers of the computing system implemented applications to find and/or enlist professionals to take part in the professional assistance programs. This is again due, in large part, to the uncertainty of the level, and specific type of assistance, which will be required.

In addition, it is also often difficult, if not impossible, for a given user to accurately determine, particularly in advance, what level and/or type of assistance they need. Consequently, it is often difficult to sell professional assistance packages to the user at the time of purchase. In many cases, the problem is further complicated by the fact that considerable time may pass, effort expended, and operations performed, before the user is even aware of errors in data entry, operation, and/or application setup. Consequently, the user may not even be aware of potential and/or existing errors that can often be avoided by getting professional assistance at the time of setup or at an earlier stage of operation. As an example, a small business using a computing system implemented accounting and/or point-of-sale application may only become aware that the computing system implemented application was not setup properly, and therefore is not operating correctly, when a monthly, quarterly, or even yearly, report is generated by the computing system implemented accounting and/or point or sale application.

As a result of the inability to accurately pre-determine the level of assistance, and what type of assistance, will be needed by a given user, providers of computing system implemented applications are often unable to economically provide professional assistance to users of their computing system implemented applications. This situation results in a disservice to both the user and the providers of the computing system implemented applications.

SUMMARY

In accordance with one embodiment, a method and system for providing setup assistance for applications includes a process for providing setup assistance for applications whereby, in one embodiment, once a user has begun to implement, or has implemented, a given computing system implemented application, the user of the computing system implemented application is offered assistance for setting up, and/or operating, all, or part of, the computing system implemented application based, at least in part, on the amount, and/or type of, data the user has entered, plans to enter, imported, or plans to import, for use with and/or by the computing system implemented application.

As noted above, herein, a computing system implemented application can be, but is not limited to, any of the following: a computing system implemented personal financial management system; a computing system implemented home inventory system; a computing system implemented business inventory system; a computing system implemented point-of-sale system; a computing system implemented personal asset management system; a computing system implemented business asset management system; a computing system implemented personal accounting system; a computing system implemented business accounting system; a computing system implemented tax preparation system; and/or any of the numerous computing system implemented applications known to those of skill in the art.

In accordance with one embodiment, the setup process and/or implementation for given computing system implemented application is divided into at least one module and/or stage. In accordance with one embodiment, when a user begins to implement a particular stage and/or module of the given computing system implemented application, the user is informed of what actions will be performed in the particular stage and any historical and/or specific issues that may arise in that particular stage of the application setup. In one embodiment, the user is also asked specific questions about their specific needs and/or the data the user intends to enter and/or import for use by the computing system implemented application. In one embodiment, the user is then offered assistance based on the processes of the particular stage of setup and/or operation, and/or the answers to the questions, historical issues encountered, and/or the specific data type, and/or data volume, which the user intends to use for processing. The user is then given the option of: seeking assistance, in one embodiment through a link or other connection to the assistance service; skipping the particular stage and, in one embodiment, flagging the particular stage for later completion and/or re-visitation; or proceeding without assistance.

In accordance with one embodiment, as a user is implementing and/or installing a particular stage and/or module of the setup of a given computing system implemented application, at specific operations and/or tasks and/or data entry points within the particular stage and/or module of the setup the user is offered assistance based on the specific operation and/or task and/or data entry point, and/or the answers to the questions previously asked, historical issues encountered, and/or the specific type of data, and/or data volume, which the user intends to enter and/or import for processing. Once again, in one embodiment, the user is given the option of: seeking assistance, in one embodiment through a link or other connection to the assistance service; skipping the specific operation and/or task and/or data entry point and, in one embodiment, flagging the specific operation and/or task and/or data entry point for later completion and/or re-visitation; or proceeding without assistance.

In accordance with one embodiment, when a user completes, and/or reaches the end, of a particular stage and/or module of the setup and/or operation of a given computing system implemented application, an analysis of the implementation of the particular stage and/or module is performed. The user is then offered assistance based on the evaluated success of the implementation of the particular stage and/or module, any specific issues encountered, and/or any specific operations and/or tasks and/or data entry points previously skipped and/or flagged by the user. In one embodiment, the user is then again given the option of: seeking assistance, in one embodiment through a link or other connection to the assistance service; skipping the particular stage and, in one embodiment, flagging the particular stage; or proceeding without assistance.

In some embodiments, the particular stage and/or module of the setup and/or operation of a given computing system implemented application represents the entire computing system implemented application setup process. In other embodiments, a given application may consist of multiple setup stages and/or modules. In some embodiments, multiple setup stages and/or modules can be combined as desired.

Using the method and system for providing setup assistance for applications disclosed herein, a user is offered assistance based, at least in part, on the user's response to questions about the user's specific needs and the amount, and/or type of, data the user is entering into, and/or importing into, the computing system implemented application. Consequently, using the method and system for providing setup assistance for applications disclosed herein, the user is offered assistance where and when it is needed so that the user can not only accurately determine how much assistance is needed, but the user can also accurately determine what type of assistance is needed. This information can, in turn, be used to find and/or enlist the proper professional assistance efficiently. As a result, using the method and system for providing setup assistance for applications disclosed herein, the user is significantly more likely to obtain proper setup assistance and is therefore far more likely to be satisfied with the computing system implemented application and to continue to use the computing system implemented application.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3 is one example of a user interface screen shot including a assistance offer in accordance with one embodiment;

FIG. 4 is one example of a user interface screen shot including a assistance offer in accordance with one embodiment;

FIG. 5 is one example of a user interface screen shot including an assistance offer in accordance with one embodiment;

FIG. 6 is one example of a user interface screen shot including an assistance offer in accordance with one embodiment;

FIG. 7 is one example of a user interface screen shot including an assistance offer in accordance with one embodiment;

FIG. 8 is one example of a user interface screen shot including an assistance offer in accordance with one embodiment; and FIG. 9 is one example of a user interface screen shot including an assistance offer in accordance with one embodiment.

Figure 1:
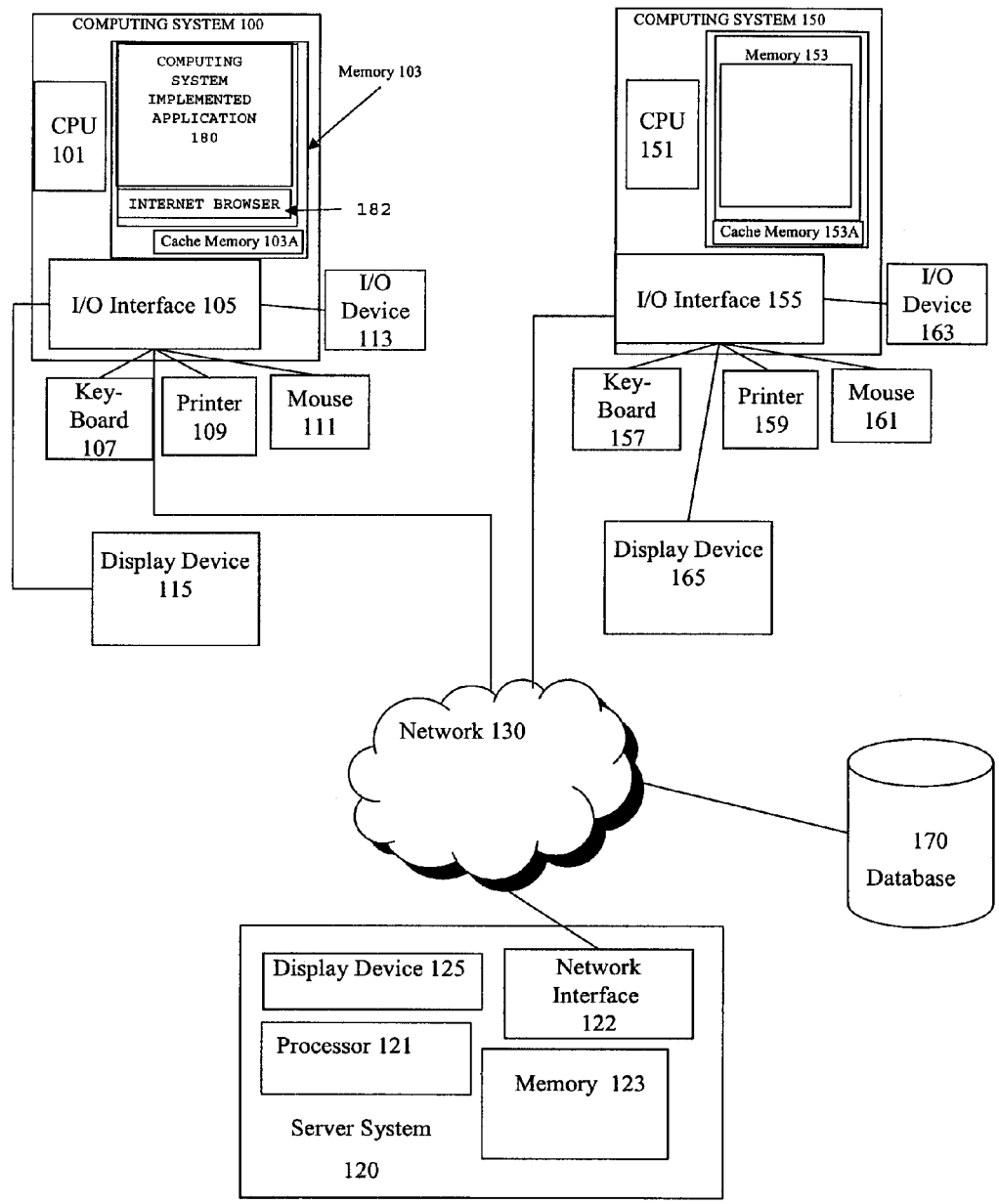
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

For illustrative purposes, some embodiments are described herein within the framework of, and using, one or more computing system implemented applications. Various specific details are discussed below, and shown in the accompanying FIGS., to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, delivered from a website and/or web-based function, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for providing setup assistance for applications, such as exemplary process 200 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented application 180 such as, but not limited to: a computing system implemented personal financial management system; a computing system implemented business financial management system; a computing system implemented point-of-sale system; a computing system implemented personal accounting system; a computing system implemented business accounting system; a computing system implemented tax preparation system; a computing system implemented healthcare management system; or any other computing system implemented personal and/or business data management system. In one embodiment, computing system implemented application 180 is stored, in whole, or in part, in memory system 103, and is used by, or includes, as discussed below, a process for providing setup assistance for applications, such as exemplary process 200 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing setup assistance for applications and/or a computing system implemented application are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, is stored, in whole, or in part in memory 103.

In one embodiment, computing system 100 is a computing system accessible by a user and used and/or accessible by another computing system, such as computing system 150 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for providing setup assistance for applications, and/or a computing system implemented application, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

As discussed in more detail below, in one embodiment, all, or part of, a process for providing setup assistance for applications, and/or a computing system implemented application, can also be loaded, in whole, or in part, into computing system 150 from computing system 100 for storage in memory system 153 and/or cache memory 153A.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the user, and/or the user's agents, and/or a process for providing setup assistance for applications, such as exemplary process 200, and/or a computing system implemented process, such as a computing system implemented application 180.

In one embodiment, database 170 is used, controlled, and/or accessible by, a provider of and/or a system and process for providing setup assistance for applications, such as process for providing setup assistance for applications 200. In one embodiment, database 170 is used, controlled, and/or accessible by, a provider of and/or a computing system implemented application, such as a computing system implemented application 180.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for providing setup assistance for applications, such as process for providing setup assistance for applications 200. In one embodiment, server system 120 is used, controlled, and/or accessible by, a provider of and/or a computing system implemented application, such as a computing system implemented application 180.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for providing setup assistance for applications, such as process for providing setup assistance for applications 200, and/or a computing system implemented application, such as a computing system implemented application 180, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing setup assistance for applications, such as process for providing setup assistance for applications 200, and/or a computing system implemented application, such as computing system implemented application 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing setup assistance for applications, such as process for providing setup assistance for applications 200, and/or a computing system implemented application, such as a computing system implemented application 180, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing setup assistance for applications, such as process for providing setup assistance for applications 200, and/or a computing system implemented application, such as a computing system implemented application 180, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

For example, all, or part, of a process for providing setup assistance for applications, such as process for providing setup assistance for applications 200, and/or a computing system implemented application, such as a computing system implemented application 180, may be stored in a memory that is physically located in a location, such as server system memory 123, or database 170, of FIG. 1, different from a computing system, such as computing systems 100 and/or 150 of FIG. 1, utilizing a process for providing setup assistance for applications, and/or a computing system implemented application. In one embodiment, all, or part, of a process for providing setup assistance for applications, and/or a computing system implemented application, may be stored in a memory that is physically located, separate from the computing system's processor(s), such as CPUs 101 and 151 of FIG. 1, and the computing system CPUs can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for providing setup assistance for applications, such as process for providing setup assistance for applications 200, and/or a computing system implemented application, such as a computing system implemented application 180, is a portable computer, a workstation, a two-way pager, a cellular telephone, a smart phone, a digital wireless telephone, a PDA, a server computer, an Internet appliance, or any other device that includes components that can execute all, or part, of a process for providing setup assistance for applications, and/or a computing system implemented application, in accordance with at least one of the embodiments as described herein. Similarly, in another embodiment, a process for providing setup assistance for applications, and/or a computing system implemented application, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "user", "individual", "consumer", and/or "customer" are used interchangeably to denote any party interfacing and/or interacting with a process for providing setup assistance for applications, and/or any other authorized party associated with any party interfacing and/or interacting with a process for providing setup assistance for applications, and/or a person who is the subject of, and/or target of, any information obtained by a process for providing setup assistance for applications.

As used herein, the terms "computing system implemented application" and "application" are used interchangeable, to denote, but are not limited to: computing system implemented personal and small business financial management systems, packages, programs, modules, or applications; computing system implemented business systems, packages, programs, modules, or applications; computing system implemented point-of-sale systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "setup" of a computing system implemented application is used to denote the integration, and/or use of the computing system implemented application including, but not limited to, the entry and/or importation of new and/or existing data from one or more sources.

In accordance with one embodiment, a method and system for providing setup assistance for applications includes a process for providing setup assistance for applications whereby, in one embodiment, once a user has begun to implement a given computing system implemented application, the user of the computing system implemented application is offered assistance for setting up and/or implementing all, or part of, the computing system implemented application based, at least in part, on the amount, and/or type of, data the user has entered, plans to enter, imported, or plans to import, for use with and/or by the computing system implemented application.

As noted above, herein, a computing system implemented application can be, but is not limited to, any of the following: a computing system implemented personal financial management system; a computing system implemented home inventory system; a computing system implemented business inventory system; a computing system implemented point-of-sale system; a computing system implemented personal asset management system; a computing system implemented business asset management system; a computing system implemented personal accounting system; a computing system implemented business accounting system; a computing system implemented tax preparation system; and/or any of the numerous computing system implemented applications known to those of skill in the art.

In accordance with one embodiment, the setup process and/or implementation for given computing system implemented application is divided into at least one module and/or stage. In accordance with one embodiment, when a user begins to implement a particular stage and/or module of the given computing system implemented application, the user is informed of what actions will be performed in the particular stage and any historical and/or specific issues that may arise in that particular stage of the application setup. In one embodiment, the user is also asked specific questions about their specific needs and/or the data the user intends to enter and/or import for use by the computing system implemented application. In one embodiment, the user is then offered assistance based on the processes of the particular stage of setup and/or operation, and/or the answers to the questions, historical issues encountered, and/or the specific data type, and/or data volume, which the user intends to use for processing. The user is then given the option of: seeking assistance, in one embodiment through a link or other connection to the assistance service; skipping the particular stage and, in one embodiment, flagging the particular stage for later completion and/or re-visitation; or proceeding without assistance.

In accordance with one embodiment, as a user is implementing and/or installing a particular stage and/or module of the setup of a given computing system implemented application, at specific operations and/or tasks and/or data entry points within the particular stage and/or module of the setup the user is offered assistance based on the specific operation and/or task and/or data entry point, and/or the answers to the questions previously asked, historical issues encountered, and/or the specific type of data, and/or data volume, which the user intends to enter and/or import for processing. Once again, in one embodiment, the user is given the option of: seeking assistance, in one embodiment through a link or other connection to the assistance service; skipping the specific operation and/or task and/or data entry point and, in one embodiment, flagging the specific operation and/or task and/or data entry point for later completion and/or re-visitation; or proceeding without assistance.

In accordance with one embodiment, when a user completes, and/or reaches the end, of a particular stage and/or module of the setup and/or operation of a given computing system implemented application, an analysis of the implementation of the particular stage and/or module is performed. The user is then offered assistance based on the evaluated success of the implementation of the particular stage and/or module, any specific issues encountered, and/or any specific operations and/or tasks and/or data entry points previously skipped and/or flagged by the user. In one embodiment, the user is then again given the option of: seeking assistance, in one embodiment through a link or other connection to the assistance service; skipping the particular stage and, in one embodiment, flagging the particular stage; or proceeding without assistance.

Figure 2:
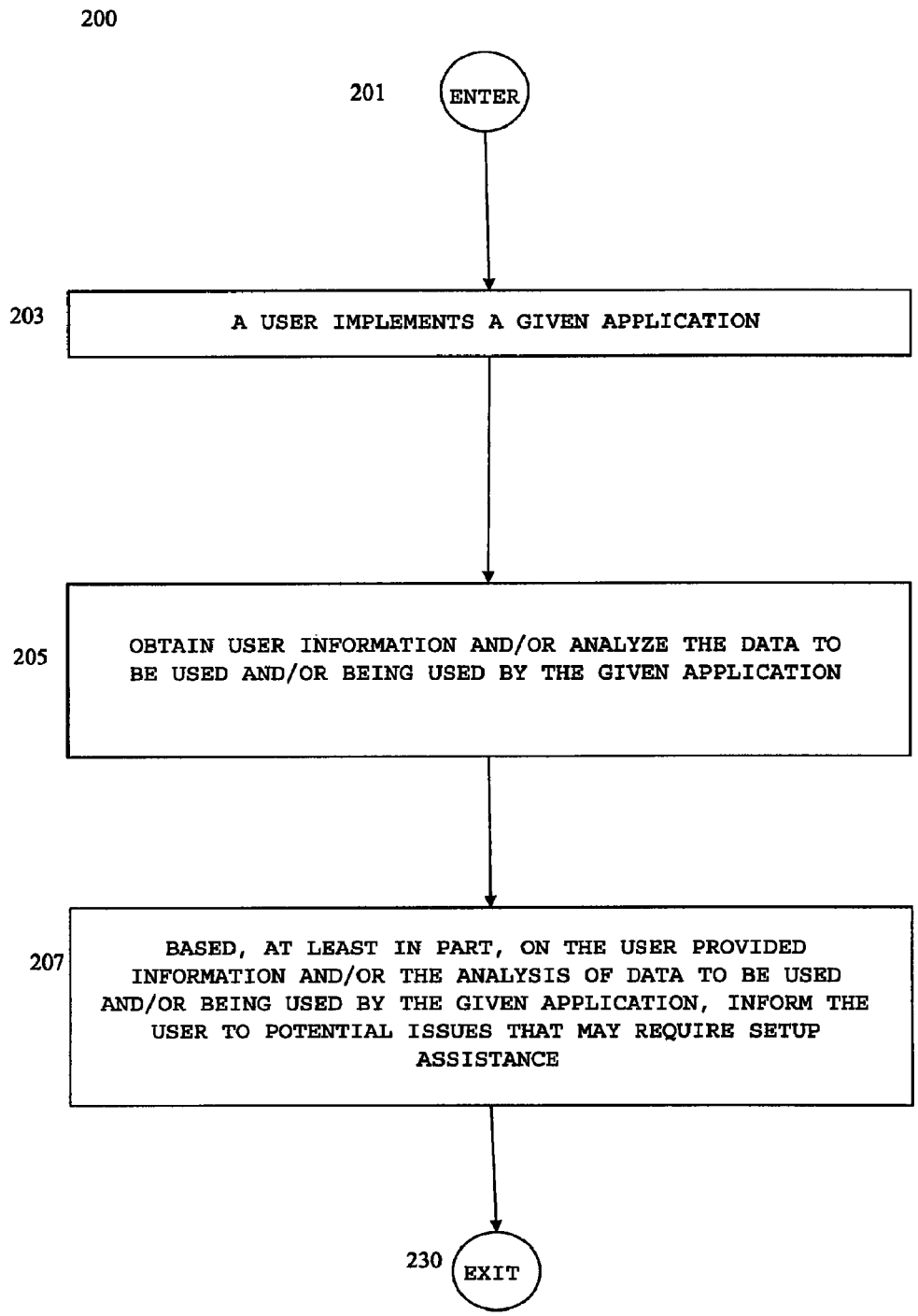
FIG. 2 is a flow chart depicting a process for providing setup assistance for applications in accordance with one embodiment.

FIG. 2 a flow chart depicting a process for providing setup assistance for applications 200 in accordance with one embodiment. Process for providing setup assistance for applications 200 begins at ENTER OPERATION 201 of FIG. 2 and process flow proceeds to A USER IMPLEMENTS A GIVEN APPLICATION OPERATION 203.

In one embodiment, at A USER IMPLEMENTS A GIVEN APPLICATION OPERATION 203 a user obtains and proceeds to install and/or setup and/or operate a computing system implemented application, such as computing system implemented application 180 (FIG. 1), that implements, includes, is accessed by, and/or is otherwise associated with process for providing setup assistance for applications 200 (FIG. 2).

As noted above, currently, various computing system implemented applications are available, including but not limited to: computing system implemented personal and small business financial management systems, packages, programs, modules, or applications; computing system implemented point-of-sale systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As also noted above, while computing system implemented applications often provide efficient and accurate methods for gathering and processing data, proper setup of these computing system implemented applications i.e., integrating and adapting the computing system implemented application to the user's specific data and processing needs, is often a critical step for ensuring the computing system implemented applications operate in the intended fashion. As one example, in some embodiments, a user may have significant existing data that must be transferred/imported to computing system implemented application of A USER IMPLEMENTS A GIVEN APPLICATION OPERATION 203. In some embodiments, a user may not have any legacy data and the all data must be entered, properly, for the first time into the computing system implemented application of A USER IMPLEMENTS A GIVEN APPLICATION OPERATION 203.

In one embodiment, at A USER IMPLEMENTS A GIVEN APPLICATION OPERATION 203, the user is asked specific questions about their specific needs and/or the data the user intends to enter and/or import for use by the computing system implemented application. In one embodiment, the user then responds to the questions using a user interface device such as, but not limited to, a keyboard, mouse, touchpad, or any other device capable of providing user input to a computing system and/or for translating user actions into computing system operations, whether known at the time of filing or as developed later. The types of questions asked at A USER IMPLEMENTS A GIVEN APPLICATION OPERATION 203 will vary considerably based on the type of application being setup at A USER IMPLEMENTS A GIVEN APPLICATION OPERATION 203 and the desires of the provider of the application being setup at A USER IMPLEMENTS A GIVEN APPLICATION OPERATION 203 and/or the needs of the user.

In one embodiment, data representing the user's response to the questions asked at A USER IMPLEMENTS A GIVEN APPLICATION OPERATION 203 is then stored by process for providing setup assistance for applications 200 in whole, or in part, by a data storage mechanism maintained by, accessible by, owned by, or otherwise related to: process for providing setup assistance for applications 200, and/or a provider of process for providing setup assistance for applications 200; a computing system implemented application, and/or a provider of a computing system implemented application, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A and 153A of FIG. 1, or in any main memory or mass memory, associated with a computing system, such as computing system 100/150 described above. In one embodiment, the data, in whole, or in part, is stored in any computing system and/or server system, such as computing system 100/150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, by: process for providing setup assistance for applications 200, and/or a provider of process for providing setup assistance for applications 200; a computing system implemented application, and/or a provider of a computing system implemented application; a third party data storage institution; any third party service or institution; or any other parties.

In one embodiment, once a user obtains and begins to install and/or setup and/or operate a computing system implemented application, such as computing system implemented application 180 (FIG. 1), at A USER IMPLEMENTS A GIVEN APPLICATION OPERATION 203, process flow proceeds to OBTAIN USER INFORMATION AND/OR ANALYZE THE DATA TO BE USED AND/OR BEING USED BY THE GIVEN APPLICATION OPERATION 205.

In one embodiment, at OBTAIN USER INFORMATION AND/OR ANALYZE THE DATA TO BE USED AND/OR BEING USED BY THE GIVEN APPLICATION OPERATION 205 the data representing the user's response to the questions asked at A USER IMPLEMENTS A GIVEN APPLICATION OPERATION 203 and/or at least part of the data for transferring, importing, entering, use and/or integration with the computing system implemented application of A USER IMPLEMENTS A GIVEN APPLICATION OPERATION 203 is obtained and/or analyzed by process for providing setup assistance for applications 200.

As noted above, in some embodiments, a user may have significant existing data that must be transferred/imported to computing system implemented application of A USER IMPLEMENTS A GIVEN APPLICATION OPERATION 203. In some embodiments, a user may not have any legacy data and all data must be entered for the first time into the computing system implemented application of A USER IMPLEMENTS A GIVEN APPLICATION OPERATION 203.

In one embodiment, at OBTAIN USER INFORMATION AND/OR ANALYZE THE DATA TO BE USED AND/OR BEING USED BY THE GIVEN APPLICATION OPERA- TION 205, process for providing setup assistance for applications 200 is provided access to the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 by storing the data representing the user's response to the questions and/or at least part of the data the user intends to transfer and then providing process for providing setup assistance for applications 200 access to the data, either directly or through a computing system implemented application.

In one embodiment, at OBTAIN USER INFORMATION AND/OR ANALYZE THE DATA TO BE USED AND/OR BEING USED BY THE GIVEN APPLICATION OPERATION 205, process for providing setup assistance for applications 200 is provided access to the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 by transferring the data to process for providing setup assistance for applications 200 either directly or through a computing system implemented application.

In one embodiment, at OBTAIN USER INFORMATION AND/OR ANALYZE THE DATA TO BE USED AND/OR BEING USED BY THE GIVEN APPLICATION OPERATION 205, process for providing setup assistance for applications 200 is provided access to the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

Returning to FIG. 2, in other embodiments, at OBTAIN USER INFORMATION AND/OR ANALYZE THE DATA TO BE USED AND/OR BEING USED BY THE GIVEN APPLICATION OPERATION 205, process for providing setup assistance for applications 200 is provided access to the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 through e-mail or through text messaging or other data and/or text transfer mechanism.

In one embodiment, at OBTAIN USER INFORMATION AND/OR ANALYZE THE DATA TO BE USED AND/OR BEING USED BY THE GIVEN APPLICATION OPERATION 205, process for providing setup assistance for applications 200 is provided access to the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 by any method, apparatus, process or mechanism for transferring and/or accessing data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In one embodiment, at OBTAIN USER INFORMATION AND/OR ANALYZE THE DATA TO BE USED AND/OR BEING USED BY THE GIVEN APPLICATION OPERATION 205, the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 is analyzed and/or categorized by process for providing setup assistance for applications 200 to determine the specific needs of the user and/or specific user issues and/or potential points where the user may wish to obtain professional assistance in setting up the application of A USER IMPLEMENTS A GIVEN APPLICATION OPERATION 203. In one embodiment, the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203 is also analyzed in light of the context and/or proposed use of the data, i.e., the data is analyzed, based in part, on what stage and/or operation of the setup of the application is being performed.

The analysis of OBTAIN USER INFORMATION AND/OR ANALYZE THE DATA TO BE USED AND/OR BEING USED BY THE GIVEN APPLICATION OPERATION 205 will vary considerably from application type-to-application type, as will the identified points where the user may wish to obtain professional assistance. Consequently, a more detailed discussion of the analysis of OBTAIN USER INFORMATION AND/OR ANALYZE THE DATA TO BE USED AND/OR BEING USED BY THE GIVEN APPLICATION OPERATION 205 is omitted here to avoid detracting from the invention.

In one embodiment, once the data representing the user's response to the questions asked at A USER IMPLEMENTS A GIVEN APPLICATION OPERATION 203 and/or at least part of the data for transferring, importation, entering, use, and/or integration with the computing system implemented application of A USER IMPLEMENTS A GIVEN APPLICATION OPERATION 203 is obtained and/or analyzed by process for providing setup assistance for applications 200 at OBTAIN USER INFORMATION AND/OR ANALYZE THE DATA TO BE USED AND/OR BEING USED BY THE GIVEN APPLICATION OPERATION 205, process flow proceeds to BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207.

In one embodiment at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207, the user is alerted to, and/or informed of, a potential need for, and/or offered, professional assistance for, parts of the application setup and/or operation process where, based on historical experience and the analysis of OBTAIN USER INFORMATION AND/OR ANALYZE THE DATA TO BE USED AND/OR BEING USED BY THE GIVEN APPLICATION OPERATION 205, the user may wish to consider obtaining professional setup assistance.

In one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 the alert and/or offer to the user takes the form of a display within a user interface used by the user to perform the application setup. In some embodiments, the alert and/or offer is a pop-up display and/or graphic. In some embodiments, the alert and/or offer is a flashing symbol and/or other visual based alert. In some embodiments, the alert and/or offer is an audible alert and includes a link and/or icon. In other embodiments, the alert and/or offer to the user generated at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 takes any form of obtaining a user's attention, whether known at the time of filing or as developed thereafter.

In one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 when the user begins to implement a particular stage and/or module of the computing system implemented application of A USER IMPLEMENTS A GIVEN APPLICATION OPERATION 203, the user is informed of what actions will be performed in the particular stage and any historical and/or specific issues that may arise in that particular stage of setup. In one embodiment, the specific potential issues for the user are identified based, at least in part, on the analysis performed at OBTAIN USER INFORMATION AND/OR ANALYZE THE DATA TO BE USED AND/OR BEING USED BY THE GIVEN APPLICATION OPERATION 205 using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

In one embodiment, the user is also asked further module/stage specific questions about their specific needs and/or the data the user intends to enter and/or import for use by the computing system implemented application. In one embodiment, the user is then offered assistance based on the processes of the particular stage of setup, and/or the answers to the questions, and/or the specific data, and/or data volume, which the user intends to import for processing by the computing system implemented application. In one embodiment, the user is then given the option of: seeking assistance, in one embodiment through a link or other connection to the assistance service; skipping the particular stage and, in one embodiment, flagging the particular stage for later completion and/or re-visitation; or proceeding without assistance.

FIG. 3 shows one example of a beginning of stage alert and/or offer 300 as would be generated at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 (FIG. 2) when the user begins a particular stage and/or module of the setup of a given computing system implemented application of A USER IMPLEMENTS A GIVEN APPLICATION OPERATION 203.

As shown in FIG. 3, in this specific example, beginning of stage alert and/or offer 300 is offered at the beginning of a customer listing data entry stage 301 of a given computing system implemented application, in this specific example, a business accounting application. As seen in FIG. 3, in this specific example, beginning of stage alert and/or offer 300 includes: module description section 303 where the actions to be taken in the given module, in this specific example the customer listing data entry module, are briefly described; potential issues section 305 where general and/or historical issues regarding the given module, in this specific example the customer listing data entry module, are listed and described; and specific issues section 307, where specific issues for the given user are described and discussed based, in part, on the analysis performed by process for providing setup assistance for applications 200 (FIG. 2) at OBTAIN USER INFORMATION AND/OR ANALYZE THE DATA TO BE USED AND/OR BEING USED BY THE GIVEN APPLICATION OPERATION 205.

As also seen in FIG. 3, in this specific example, beginning of stage alert and/or offer 300 includes: skip this module for now and flag it option 309; link me to a setup assistant option 311; and proceed without assistance option 313. As seen in FIG. 3, in this specific example, the user has elected to proceed without assistance by selecting proceed without assistance option 313.

Those of skill in the art will readily recognize that the specific data presented, the formatting of the data, the visual presentation of the data, and the display of text in FIG. 3 was shown for illustrative purposes only and that, in various embodiments, numerous other specific data can be presented, formatted, graphed, displayed, and described. Consequently, the specific example and illustration of FIG. 3 does not limit the invention as claimed below.

As noted above, in some embodiments, the particular stage and/or module of the setup of a given computing system implemented application discussed above represents the entire computing system implemented application setup process, i.e., the entire application setup includes only one setup module/stage. In other embodiments, a given application may consist of multiple setup stages and/or modules. In some embodiments, multiple setup stages and/or modules can be combined as desired.

Returning to FIG. 2, in one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 as a user is implementing and/or installing a particular stage and/or module of the setup of a given computing system implemented application, at specific operations and/or tasks and/or data entry points of the module and/or stage, the user is alerted to specific potential issues and/or offered assistance.

In one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 the specific issues are determined for the specific operations and/or tasks and/or data entry points based on the analysis performed at OBTAIN USER INFORMATION AND/OR ANALYZE THE DATA TO BE USED AND/OR BEING USED BY THE GIVEN APPLICATION OPERATION 205 using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

In one embodiment, the user is also asked further operation specific questions about their specific needs and/or the data the user intends to enter and/or import for use by the computing system implemented application at the specific operation and/or task and/or data entry point, the answers to these questions, and/or the answers to the questions previously asked, and/or the specific data, and/or data volume, which the user intends to enter and/or import for processing is then used to make recommendations regarding professional assistance. Once again, in one embodiment, the user is given the option of: seeking assistance, in one embodiment through a link or other connection to the assistance service; skipping the specific operation and/or task and/or data entry point and, in one embodiment, flagging the specific operation and/or task and/or data entry point for later completion and/or re-visitation; or proceeding without assistance.

FIG. 4 shows one example of a specific operation and/or task and/or data entry point alert and/or offer 413 as would be generated at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 (FIG. 2) at a specific operation and/or task and/or data entry point 411 (FIG. 4) of a given computing system implemented application of A USER IMPLEMENTS A GIVEN APPLICATION OPERATION 203 (FIG. 2).

As shown in FIG. 4, specific operation and/or task and/or data entry point alert and/or offer 413 is generated at the customer balance data entry point (customer balance column 411) within the customer listing module 301 of the application setup process. As seen in FIG. 4, in this specific example, customer listing module 301 includes electronic ledger 400 including: customer name column 403; customer address column 405; customer phone column 407; date of last purchase column 409; and customer balance column 411.

As seen in FIG. 4, at customer balance column 411, specific operation and/or task and/or data entry point alert and/or offer 413 is generated pointing out to the user that the given data entry point, in this specific example customer balance column 411, is often a point where a user can benefit from professional assistance. As noted above, in one embodiment, specific operation and/or task and/or data entry point alert and/or offer 413 is generated based, in part, on the analysis performed at OBTAIN USER INFORMATION AND/OR ANALYZE THE DATA TO BE USED AND/OR BEING USED BY THE GIVEN APPLICATION OPERATION 205 (FIG. 2) using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

As also seen in FIG. 4, in this specific example, specific operation and/or task and/or data entry point alert and/or offer 413 includes: skip this operation for now and flag it option 415; link me to a setup assistant option 417; and proceed without assistance option 419. As seen in FIG. 4, in this specific example, the user has elected to skip the customer balance transfer operation and flag it by selecting skip this operation for now and flag it option 415.

Those of skill in the art will readily recognize that the specific data presented, the formatting of the data, the visual presentation of the data, and the display of text in FIG. 4 was shown for illustrative purposes only and that, in various embodiments, numerous other specific data can be presented, formatted, graphed, displayed, and described. Consequently, the specific example and illustration of FIG. 4 does not limit the invention as claimed below.

In accordance with one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207, when a user completes, and/or reaches the end, of a particular stage and/or module of the setup of a given computing system implemented application of A USER IMPLEMENTS A GIVEN APPLICATION OPERATION 203, an analysis of the implementation of the particular stage and/or module is performed by process for providing setup assistance for applications 200. The user is then alerted to the potential need for professional assistance, and/or offered professional assistance, based on the evaluated success of the implementation of the particular stage and/or module, any specific issues encountered, and/or any specific operations and/or tasks and/or data entry points skipped and/or flagged previously. In one embodiment, the user is then again given the option of: seeking assistance, in one embodiment through a link or other connection to the assistance service; skipping the particular stage and, in one embodiment, flagging the particular stage; or proceeding without assistance.

FIG. 5 shows one example of an end of stage alert and/or offer 500 as would be generated at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 (FIG. 2) when the user completes, and/or reaches the end, of a particular stage and/or module of the setup of a given computing system implemented application of A USER IMPLEMENTS A GIVEN APPLICATION OPERATION 203.

As shown in FIG. 5, in this specific example, end of stage alert and/or offer 500 is displayed at the completion of a customer listing data entry stage 301 of a given computing system implemented application, in this specific example, a business accounting application. As seen in FIG. 5, in this specific example, end of stage alert and/or offer 500 includes:

module implementation evaluation section 503 where the success achieved in implementing the given module, in this specific example the customer listing data entry module, is evaluated and scored; potential issues section 505 where general issues regarding the given module, in this specific example the customer listing data entry module, are listed and described; and specific issues section 507, where specific issues for the given user are described and discussed based, in part, on the analysis performed by process for providing setup assistance for applications 200 (FIG. 2) at OBTAIN USER INFORMATION AND/OR ANALYZE THE DATA TO BE USED AND/OR BEING USED BY THE GIVEN APPLICATION OPERATION 205 and any operations and/or sections of the module that were skipped and/or flagged.

As also seen in FIG. 5, in this specific example, end of stage alert and/or offer 500 includes: skip this module for now and flag it option 509; link me to a setup assistant option 511; and proceed without assistance option 513. As seen in FIG. 5, in this specific example, the user has elected to be shown professional assistance options and/or contact information by selecting link me to a setup assistant option 511. In one embodiment, the selection of link me to a setup assistant option 511 results in the user being linked and/or otherwise transferred to contact information for relevant professional assistants. In one embodiment, the selection of link me to a setup assistant option 511 results in the user being linked and/or otherwise transferred directly to relevant professional assistants. In one embodiment, the selection of link me to a setup assistant option 511 results in the user being shown various professional assistance options and/or packages that would meet the needs of the user based on the information obtained by process for providing setup assistance for applications 200 (FIG. 2). In one embodiment, the selection of link me to a setup assistant option 511 results in specific professional assistance options and/or package recommendations being made to the user based on the information obtained by process for providing setup assistance for applications 200.

Those of skill in the art will readily recognize that the specific data presented, the formatting of the data, the visual presentation of the data, and the display of text in FIG. 5 was shown for illustrative purposes only and that, in various embodiments, numerous other specific data can be presented, formatted, graphed, displayed, and described. Consequently, the specific example and illustration of FIG. 5 does not limit the invention as claimed below.

In one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 when an error is detected at a particular stage and/or module of the computing system implemented application of A USER IMPLEMENTS A GIVEN APPLICATION OPERATION 203, the user is informed of the error and any historical and/or specific issues that may arise due to the error. In one embodiment, the errors are identified based, at least in part, on the analysis performed at OBTAIN USER INFORMATION AND/OR ANALYZE THE DATA TO BE USED AND/OR BEING USED BY THE GIVEN APPLICATION OPERATION 205 using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

FIG. 6 shows one example of an error based alert and/or offer 600 as would be generated at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 (FIG. 2) when an error is detected in a given computing system implemented application of A USER IMPLEMENTS A GIVEN APPLICATION OPERATION 203.

As shown in FIG. 6, in one embodiment, error based alert and/or offer 600 includes, in this specific example: module implementation evaluation section 603 where the success achieved in implementing the given module, in this specific example the chart of accounts data entry module, is evaluated and errors are listed, in this specific example indicating that the chart of accounts is out of balance; potential issues section 605 where general issues regarding the detected error, in this specific example the chart of accounts being out of balance, are listed and described; and correcting issues section 607, where specific issues for the given error and user are described and discussed based, in part, on the analysis performed by process for providing setup assistance for applications 200 (FIG. 2) at OBTAIN USER INFORMATION AND/OR ANALYZE THE DATA TO BE USED AND/OR BEING USED BY THE GIVEN APPLICATION OPERATION 205 and any operations and/or sections of the module that were skipped and/or flagged.

As also seen in FIG. 6, in this specific example, error based alert and/or offer 600 includes: speak to a support representative option 609, showing a cost of $100.00; find a local professional to provide on-site review option 611, showing a cost of $300.00; and proceed without assistance option 613. As seen in FIG. 6, in this specific example, the user has elected to find a local professional to provide on-site review by selecting find a local professional to provide on-site review option 611. In one embodiment, the selection of find a local professional to provide on-site review option 611 results in the user being linked and/or otherwise transferred to contact information for relevant professional assistants. In one embodiment, the selection of find a local professional to provide on-site review option 611 results in the user being linked and/or otherwise transferred directly to relevant professional assistants. In one embodiment, the selection of find a local professional to provide on-site review option 611 results in the user being shown various professional assistance options and/or packages that would meet the needs of the user based on the information obtained by process for providing setup assistance for applications 200 (FIG. 2). In one embodiment, the selection of find a local professional to provide on-site review option 611 results in specific professional assistance options and/or package recommendations being made to the user based on the information obtained by process for providing setup assistance for applications 200.

Those of skill in the art will readily recognize that the specific data presented, the formatting of the data, the visual presentation of the data, and the display of text in FIG. 6 was shown for illustrative purposes only and that, in various embodiments, numerous other specific data can be presented, formatted, graphed, displayed, and described. Consequently, the specific example and illustration of FIG. 6 does not limit the invention as claimed below.

In one embodiment, at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 when an error is detected during the import of data to the computing system implemented application of A USER IMPLEMENTS A GIVEN APPLICATION OPERATION 203, the user is informed of the error and any historical and/or specific issues that may arise due to the error. In one embodiment, the errors are identified based, at least in part, on the analysis performed at OBTAIN USER INFORMATION AND/OR ANALYZE THE DATA TO BE USED AND/OR BEING USED BY THE GIVEN APPLICATION OPERATION 205 using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

FIG. 7 shows one example of an error based alert and/or offer 700 as would be generated at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207 (FIG. 2) when an error is detected in imported data for a given computing system implemented application of A USER IMPLEMENTS A GIVEN APPLICATION OPERATION 203.

As shown in FIG. 7, in one embodiment, error based alert and/or offer 700 includes, in this specific example: module implementation evaluation section 703 where the success achieved in implementing the given module, in this specific example the chart of accounts data entry module, is evaluated and errors are listed, in this specific example indicating that the chart of accounts is out of balance; potential issues section 705 where general issues regarding the detected error, in this specific example the chart of accounts being out of balance, are listed and described; and correcting issues section 707, where specific issues for the given error and user are described and discussed based, in part, on the analysis performed by process for providing setup assistance for applications 200 (FIG. 2) at OBTAIN USER INFORMATION AND/OR ANALYZE THE DATA TO BE USED AND/OR BEING USED BY THE GIVEN APPLICATION OPERATION 205 and any operations and/or sections of the module that were skipped and/or flagged.

As also seen in FIG. 7, in this specific example, error based alert and/or offer 700 includes: speak to a support representative option 709, showing a cost of $100.00; use our data conversion service 710, showing a cost of $200.00; find a local professional to provide on-site review option 711, showing a cost of $300.00; and proceed without assistance option 713. As seen in FIG. 7, in this specific example, the user has elected to use the data conversion service offered by the provider of the computing system implemented application by selecting use our data conversion service 710.

Those of skill in the art will readily recognize that the specific data presented, the formatting of the data, the visual presentation of the data, and the display of text in FIG. 7 was shown for illustrative purposes only and that, in various embodiments, numerous other specific data can be presented, formatted, graphed, displayed, and described. Consequently, the specific example and illustration of FIG. 7 does not limit the invention as claimed below.

As noted above, in one embodiment, selection of certain options results in the user being shown various professional assistance options and/or packages that would meet the needs of the user. FIG. 8 shows an example of a support package offer 800.

As seen in FIG. 8, support package offer 800 includes title section 801 and recommendation and/or analysis section 803. As also seen in FIG. 8, support package offer 800 includes three support package options: silver plan 809 for $100.00; gold plan 811 for $200.00; and platinum plan 813 for $300.00.

According to one embodiment, a particular plan is recommended at recommendation and/or analysis section 803 based, at least in part, on the analysis performed at OBTAIN USER INFORMATION AND/OR ANALYZE THE DATA TO BE USED AND/OR BEING USED BY THE GIVEN APPLICATION OPERATION 205 using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

Those of skill in the art will readily recognize that the specific data presented, the formatting of the data, the visual presentation of the data, and the display of text in FIG. 8 was shown for illustrative purposes only and that, in various embodiments, numerous other specific data can be presented, formatted, graphed, displayed, and described. Consequently, the specific example and illustration of FIG. 8 does not limit the invention as claimed below.

FIG. 9 shows another example of a support package offer 900. Support package offer 900 includes title section 901, recommendation and/or analysis section 903, and specific details section 905. As also seen in FIG. 9, support package offer 900 includes three support package options: silver plan 909 for $100.00; gold plan 911 for $200.00; and platinum plan 913 for $300.00.

According to one embodiment, a particular plan is recommended at recommendation and/or analysis section 903 based, at least in part, on the analysis performed at OBTAIN USER INFORMATION AND/OR ANALYZE THE DATA TO BE USED AND/OR BEING USED BY THE GIVEN APPLICATION OPERATION 205 using the data representing the user's response to the questions asked at A USER IMPLEMENTS A GIVEN APPLICATION OPERATION 203 and/or at least part of the data the user intends to transfer, import, enter, and/or integrate with the computing system implemented application of A USER IMPLEMENTS A GIVEN APPLICATION OPERATION 203.

Those of skill in the art will readily recognize that the specific data presented, the formatting of the data, the visual presentation of the data, and the display of text in FIG. 9 was shown for illustrative purposes only and that, in various embodiments, numerous other specific data can be presented, formatted, graphed, displayed, and described. Consequently, the specific example and illustration of FIG. 9 does not limit the invention as claimed below.

As noted above, in some embodiments, the particular stage and/or module of the setup of a given computing system implemented application discussed above represents the entire computing system implemented application setup process. In other embodiments, a given application may consist of multiple setup stages and/or modules. In some embodiments, multiple setup stages and/or modules can be combined as desired.

In one embodiment, once the user is alerted to parts of the application setup process where the user may wish to obtain professional setup assistance and/or offered professional assistance at BASED, AT LEAST IN PART, ON THE USER PROVIDED INFORMATION AND/OR THE ANALYSIS OF DATA TO BE USED AND/OR BEING USED BY THE GIVEN APPLICATION, INFORM THE USER TO POTENTIAL ISSUES THAT MAY REQUIRE SETUP ASSISTANCE OPERATION 207, process flow proceeds to EXIT OPERATION 230. In one embodiment, at EXIT OPERATION 230, process for providing setup assistance for applications 200 is exited to await new data.

Using process for providing setup assistance for applications 200, a user is offered assistance once the user has begun to implement a given computing system implemented application, and based, at least in part, on the user's response to questions about the user's specific needs and the amount, and/or type of, data the user is entering into, and/or importing into, the computing system implemented application. Consequently, using process for providing setup assistance for applications 200, the user is offered assistance where and when it is needed so that the user can not only accurately determine how much assistance is needed, but the user can also accurately determine what type of assistance is needed. As a result, using process for providing setup assistance for applications 200, the user is significantly more likely to obtain setup assistance and is therefore far more likely to be satisfied with the computing system implemented application and to continue to use the computing system implemented application.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "searching", "finding", "alerting", "accessing", "analyzing", "obtaining", "deriving", "determining", "collecting", "creating", "identifying", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing setup assistance for applications comprising:
   a user performing an implementation process for a computing system implemented application;
   at least one computing processor; and
   at least one memory coupled to the at least one computing processor, the at least one memory having contained therein computing processor executable instructions which when executed by the at least one computing processor perform a process comprising:
   analyzing at least part of data used with the computing system implemented application; and
   based at least in part on the analysis of the at least part of the data used with the computing system implemented application, analyzing a percentage level of successful completion of an implementation of a given stage of the implementation process for the computing system implemented application and informing the user of a potential need for a professional assistance based, at least in part, on the percentage level of successful completion of the implementation of the given stage of the implementation process for the computing system implemented application.

2. The computing system implemented process for providing setup assistance for applications of claim 1, wherein;
   based at least in part on the analysis of the at least part of the data used with the computing system implemented application, informing the user of portions of the implementation process for the computing system implemented application where the data indicates there is a potential need to seek assistance comprises informing the user of the potential need for professional assistance at the beginning of a given stage of the implementation process for the computing system implemented application.

3. The computing system implemented process for providing setup assistance for applications of claim 1, wherein;
   based at least in part on the analysis of the at least part of the data used with the computing system implemented application, informing the user of portions of the implementation process for the computing system implemented application where the data indicates there is a potential need to seek assistance comprises informing the user of the potential need for professional assistance at a specific data entry point of a given stage of the implementation process for the computing system implemented application.

4. The computing system implemented process for providing setup assistance for applications of claim 1, wherein;
   based at least in part on the analysis of the at least part of the data used with the computing system implemented application, informing the user of portions of the implementation process for the computing system implemented application where the data indicates there is a potential need to seek assistance comprises informing the user of the potential need for professional assistance at the completion of a given stage of the implementation process for the computing system implemented application.

5. The computing system implemented process for providing setup assistance for applications of claim 1, further comprising:
   informing the user of the potential need for professional assistance at a specific data entry point of a given stage of the implementation process for the computing system implemented application; and
   informing the user of the potential need for professional assistance at the completion of a given stage of the implementation process for the computing system implemented application.

6. The computing system implemented process for providing setup assistance for applications of claim 5, wherein;
   informing the user of the potential need for professional assistance at the completion of the given stage of the implementation process for the computing system implemented application comprises analyzing the success of the implementation of the given stage of the implementation process for the computing system implemented application and informing the user of the potential need for professional assistance based, at least in part, on the analysis of the level of success of the implementation of the given stage of the implementation process for the computing system implemented application.

7. A computing system implemented process for providing setup assistance for applications comprising:
   a user performing an implementation process for a computing system implemented application;
   at least one computing processor; and
   at least one memory coupled to the at least one computing processor, the at one memory having contained therein computing processor executable instructions which when executed by the at least one computing processor perform a process comprising:
   obtaining information from the user regarding a proposed use of the computing system implemented application; and
   based at least in part on the information from the user regarding the proposed use of the computing system implemented application, analyzing a percentage level of successful completion of an implementation of a given stage of the implementation process for the computing system implemented application and informing the user of a potential need for a professional assistance based, at least in part, on the analysis of the percentage level of successful completion of the implementation of the given stage of the implementation process for the computing system implemented application.

8. The computing system implemented process for providing setup assistance for applications of claim 7, wherein;
   based at least in part on the information from the user regarding the proposed use of the computing system implemented application, informing the user of portions of the implementation process for the computing system implemented application where the information from the user regarding the proposed use of the computing system implemented application indicates there is a potential need to seek assistance comprises informing the user of the potential need for professional assistance at the beginning of a given stage of the implementation process for the computing system implemented application.

9. The computing system implemented process for providing setup assistance for applications of claim 7, wherein;
   based at least in part on the information from the user regarding the proposed use of the computing system implemented application, informing the user of portions of the implementation process for the computing system implemented application where the information from the user regarding the proposed use of the computing system implemented application indicates there is a potential need to seek assistance comprises informing the user of the potential need for professional assistance at a specific data entry point of a given stage of the implementation process for the computing system implemented application.

10. The computing system implemented process for providing setup assistance for applications of claim 7, wherein;
based at least in part on the information from the user regarding the proposed use of the computing system implemented application, informing the user of portions of the implementation process for the computing system implemented application where the information from the user regarding the proposed use of the computing system implemented application indicates there is a potential need to seek assistance comprises informing the user of the potential need for professional assistance at the completion of a given stage of the implementation process for the computing system implemented application.

11. A computer program product for providing a process for providing setup assistance for applications comprising:
a non-transitory computer readable medium; and
computer program code, encoded on the non-transitory computer readable medium, comprising computer readable instructions for:
analyzing at least part of data for use with a computing system implemented application when a user is performing an implementation process for the computing system implemented application; and
based at least in part on the analysis of the at least part of the data for use with the computing system implemented application, analyzing a percentage level of successful completion of an implementation of a given stage of the implementation process for the computing system implemented application and informing the user of a potential need for a professional assistance based, at least in part, on the percentage level of successful completion of the implementation of the given stage of the implementation process for the computing system implemented application.

12. The computer program product for providing a process for providing setup assistance for applications of claim 11, further comprising:
based at least in part on the analysis of the at least part of the data for use with a computing system implemented application, informing the user of the potential need for professional assistance at the beginning of a given stage of the implementation process for the computing system implemented application.

13. The computer program product for providing a process for providing setup assistance for applications of claim 11, further comprising
based at least in part on the analysis of the at least part of the data for use with a computing system implemented application, informing the user of the potential need for professional assistance at a specific data entry point of a given stage of the implementation process for the computing system implemented application.

14. The computer program product for providing a process for providing setup assistance for applications of claim 11, further comprising
based at least in part on the analysis of the at least part of the data for use with a computing system implemented application, informing the user of the potential need for professional assistance at the completion of a given stage of the implementation process for the computing system implemented application.

15. The computer program product for providing a process for providing setup assistance for applications of claim 14, wherein;
informing the user of the potential need for professional assistance at the completion of the given stage of the implementation process for the computing system implemented application comprises analyzing the success of the implementation of the given stage of the implementation process for the computing system implemented application and informing the user of the potential need for professional assistance based, at least in part, on the analysis of the success of the implementation of the given stage of the implementation process for the computing system implemented application.

16. The computer program product for providing a process for providing setup assistance for applications of claim 11, wherein;
based at least in part on the analysis of the at least part of the data for use with a computing system implemented application, informing the user of portions of the implementation process for the computing system implemented application where the data indicates there is a potential need to seek assistance comprises:
informing the user of the potential need for professional assistance at the beginning of a given stage of the implementation process for the computing system implemented application;
informing the user of the potential need for professional assistance at a specific data entry point of a given stage of the implementation process for the computing system implemented application; and
informing the user of the potential need for professional assistance at the completion of a given stage of the implementation process for the computing system implemented application.

17. The computer program product for providing a process for providing setup assistance for applications of claim 16, wherein;
informing the user of the potential need for professional assistance at the completion of the given stage of the implementation process for the computing system implemented application comprises analyzing the success of the implementation of the given stage of the implementation process for the computing system implemented application and informing the user of the potential need for professional assistance based, at least in part, on the analysis of the success of the implementation of the given stage of the implementation process for the computing system implemented application.

18. A computer program product for providing a process for providing setup assistance for applications comprising:
a non-transitory computer readable medium; and
computer program code, encoded on the non-transitory computer readable medium, comprising computer readable instructions for:
obtaining information from a user regarding a proposed use of a computing system implemented application when the user is performing an implementation process for the computing system implemented application; and
based at least in part on the information from the user regarding the proposed use of the computing system implemented application, analyzing a percentage level of successful completion of an implementation of a given stage of the implementation process for the computing system implemented application and informing the user of a potential need for a professional assistance based, at least in part, on the analysis of the percentage level of successful completion of the implementation of the given stage of the implementation process for the computing system implemented application.

19. The computer program product for providing a process for providing setup assistance for applications of claim 18, wherein;
based at least in part on the information from the user regarding the proposed use of the computing system implemented application, informing the user of portions of the implementation process for the computing system implemented application where the information from the user regarding the proposed use of the computing system implemented application indicates there is a potential need to seek assistance comprises informing the user of the potential need for professional assistance at the beginning of a given stage of the implementation process for the computing system implemented application.

20. The computer program product for providing a process for providing setup assistance for applications of claim 18, wherein;
based at least in part on the information from the user regarding the proposed use of the computing system implemented application, informing the user of portions of the implementation process for the computing system implemented application where the information from the user regarding the proposed use of the computing system implemented application indicates there is a potential need to seek assistance comprises informing the user of the potential need for professional assistance at a specific data entry point of a given stage of the setup of the computing system implemented application.

21. The computer program product for providing a process for providing setup assistance for applications of claim 18, wherein;
based at least in part on the information from the user regarding the proposed use of the computing system implemented application, informing the user of portions of the implementation process for the computing system implemented application where the information from the user regarding the proposed use of the computing system implemented application indicates there is a potential need to seek assistance comprises informing the user of the potential need for professional assistance at the completion of a given stage of the implementation process for the computing system implemented application.

* * * * *